United States Patent
Li et al.

(10) Patent No.: US 9,578,890 B2
(45) Date of Patent: Feb. 28, 2017

(54) ALPHA-LACTALBUMIN ENRICHED WHEY PROTEIN COMPOSITIONS AND METHODS OF MAKING AND USING THEM

(71) Applicant: Leprino Foods Company, Denver, CO (US)

(72) Inventors: Jiancai Li, Aurora, CO (US); Richard K. Merrill, Highlands Ranch, CO (US)

(73) Assignee: Leprino Foods Company, Denver, CO (US)

( * ) Notice: Subject to any disclaimer, the term of this patent is extended or adjusted under 35 U.S.C. 154(b) by 119 days.

(21) Appl. No.: 14/216,445

(22) Filed: Mar. 17, 2014

(65) Prior Publication Data

US 2014/0287095 A1 Sep. 25, 2014

Related U.S. Application Data

(60) Provisional application No. 61/803,235, filed on Mar. 19, 2013.

(51) Int. Cl.
*A23J 3/34* (2006.01)
*A23J 1/20* (2006.01)
*A23C 21/00* (2006.01)
*A23C 21/02* (2006.01)

(52) U.S. Cl.
CPC ............ *A23J 3/343* (2013.01); *A23J 1/205* (2013.01); *A23C 21/00* (2013.01); *A23C 21/02* (2013.01)

(58) Field of Classification Search
CPC A23C 21/00; A23C 21/02; A23J 1/205; A23J 3/343
USPC ............................ 426/34, 41, 42, 580, 583
See application file for complete search history.

(56) References Cited

U.S. PATENT DOCUMENTS

| | | | |
|---|---|---|---|
| 5,322,773 A | 6/1994 | Kaneko et al. | |
| 5,916,621 A | 6/1999 | Georgi et al. | |
| 8,222,372 B2 * | 7/2012 | Budolfsen et al. | 530/350 |
| 2007/0172579 A1 * | 7/2007 | Blanton et al. | 426/660 |

OTHER PUBLICATIONS

International Search Report and Written Opinion of international application No. PCT/US2014/031160, mailed Aug. 15, 2014, 13 pages.
International Preliminary Report on Patentability of international application No. PCT/US2014/031160, issued Sep. 22, 2015, 9 pages.

* cited by examiner

*Primary Examiner* — Leslie Wong
(74) *Attorney, Agent, or Firm* — Kilpatrick Townsend & Stockton, LLP

(57) ABSTRACT

Methods are described for treating a whey protein mixture to increase a relative concentration of α-lactalbumin protein in the mixture. The methods may include the step of adjusting a temperature of the whey protein mixture to about 10° C. or less, and adjusting the pH of the mixture to greater than 7. The may further include adding a protease enzyme to the whey protein mixture that selectively hydrolyzes β-lactoglobulin protein in the mixture. The activity of the protease enzyme in the hydrolyzed whey protein mixture may be terminated before a substantial portion of the α-lactalbumin protein has been hydrolyzed by the enzyme. In some instances, the whey protein mixture may also include glycomacropeptides that are selectively hydrolyzed with the β-lactoglobulin protein. The β-lactoglobulin and glycomacropeptide hydrolysates may be separated to produce an enhanced α-lactalbumin protein composition for infant formula, among other products.

21 Claims, 4 Drawing Sheets

ALPHA-LACTALBUMIN ENRICHED WHEY PROTEIN COMPOSITIONS AND METHODS OF MAKING AND USING THEM

CROSS-REFERENCE TO RELATED APPLICATIONS

This application claims the benefit of U.S. Provisional Application No. 61/803,235 filed Mar. 19, 2013 and entitled "ALPHA-LACTALBUMIN ENRICHED WHEY PROTEIN COMPOSITIONS AND METHODS OF MAKING AND USING THEM," the entire disclosure of which is hereby incorporated by reference for all purposes, as if fully set forth herein.

BACKGROUND

Whey is a liquid by-product of cheesemaking processes that provides a source of high quality protein for foods, cosmetics, and other products. Whey protein from cow's milk is actually a collection of different proteins that primarily include β-lactoglobulin (β-Lg), and α-lactalbumin (α-La), as well as glycomacropepties (GMPs) cleaved from the native casein proteins in the milk that coagulate into the cheese curd. While β-Lg has the greatest wt. % in cow's milk, this protein has a much lower concentration or is absent in human milk and can be more difficult to digest than α-La. Efforts have been made to reduce the high concentration of β-Lg in whey protein from cow's milk and bring the relative concentration of β-Lg to α-La closer to that of human milk.

These efforts have included contacting the whey protein with resins that selectively absorb or attach one or more of the whey proteins. These separation processes may include passing the native whey protein over a column of resin beads that selectively capture one or more of the protein components in the whey. Unfortunately, there have been significant challenges in developing resin materials that selectively bind α-La or β-Lg that do not capture significant amounts of the other. There have also been challenges releasing the bound proteins from the resin once the whey has passed through the column. Processes and resins have also been developed for the selective binding of GMPs, but these resins do not substantially alter the relative concentration of β-Lg to α-La, which is still heavily tilted towards β-Lg in bovine whey.

Additional efforts to separate and purify native whey include the addition of one or more chemical elements to whey that selective precipitate one or more of the proteins. Examples of these processes include the addition of ferric chloride to the whey under tightly controlled temperature and pH conditions to precipitate β-Lg. Like the resin separation techniques, there have been problems selectively precipitating the β-Lg without also precipitating significant amounts of α-La. Furthermore, removal of the precipitation salts on a commercial scale adversely impacts the economics of purifying bovine whey that is intended for human consumption.

Still other approaches have used targeted enzymatic hydrolysis to denature one or more of the whey proteins. There remains significant unpredictability in the selection of—among other factors—the enzymes, temperature, reaction time, and acidity when targeting a specific whey protein for hydrolysis without also hydrolyzing significant amounts of other proteins. In addition, small protein hydrolysates made of just one or a few amino acids (i.e., oligopeptides) often create bitter flavors and brothy solutions that have a very disagreeable taste for the average consumer.

There remains a need for processes and systems that can increase the concentration of α-La from sources of native whey such as cow's milk and sweet whey. There also remains a need for purified whey compositions with increased concentrations of α-La and reduced concentrations of β-Lg and/or GMPs that can be produced economically on a commercial scale and that are palatable to most consumers. These and other challenges are address in the present application.

BRIEF SUMMARY

Methods and systems are described for taking sources of native whey that are heavily concentrated in β-Lg protein, GMPs, or both, and treating them with enzymes that hydrolyze the β-Lg and/or GMPs to increase the relative concentration of α-La in the whey. These methods may include selecting factors such as enzyme type, temperature, pH, and/or incubation time that favor the denaturization (e.g., conformational change and/or hydrolysis) of β-Lg and/or GMPs over α-La to produce a mixture with increased relative concentration of the α-La compared to β-Lg and/or GMPs.

The methods and systems find particular application for treating native whey that sourced from dairy products such as cow's milk and/or the whey separated from curd during cheesemaking processes. These bovine-sourced native whey compositions typically start with relative wt. % ratios favoring β-Lg over α-La by about 4:1 to about 2.5:1. For whey derived from cheesemaking processes, there also a significant wt. % of GMPs (sometimes up to 20 wt. % of the whey protein composition) depending on the type of cheese made. Treatment of these native whey mixtures may reduce the amount of β-Lg and/or GMPs by at least about 60 wt. %, 70 wt. %, 80 wt. %, 90 wt. %, 95 wt. %, etc. Typically, the treatment results in α-La becoming the dominate protein in the treated whey protein mixture.

Embodiments may include methods of treating a whey protein mixture to increase the relative concentration of α-La protein in the mixture. The methods may include adjusting the temperature of the mixture to about 10° C. or less and adjusting the pH of the mixture to greater than about 7. One or more protease enzymes may be added to the mixture to selectively hydrolyze the β-Lg and/or GMPs in the mixture. The activity of the protease enzymes may be terminated before a substantial portion of the α-La is hydrolyzed by the enzyme(s).

Embodiments may further include methods of making a protein composition that include providing a whey protein solution having α-La, β-Lg and GMPs. The temperature of the solution may be adjusted to about 10° C. or less and the pH of the solution may be adjusted to greater than about 7. One or more protease enzymes may be added to the whey protein solution to selectively hydrolyze the β-Lg and/or GMPs until their activity is terminated. The termination point may be selected when the increase in the wt. % ratio of α-La to β-Lg and/or GMPs reaches a threshold level.

Additional embodiments and features are set forth in part in the description that follows, and in part will become apparent to those skilled in the art upon examination of the specification or may be learned by the practice of the invention. The features and advantages of the invention may be realized and attained by means of the instrumentalities, combinations, and methods described in the specification.

BRIEF DESCRIPTION OF THE DRAWINGS

A further understanding of the nature and advantages of the present invention may be realized by reference to the remaining portions of the specification and the drawings wherein like reference numerals are used throughout the several drawings to refer to similar components. In some instances, a sublabel is associated with a reference numeral and follows a hyphen to denote one of multiple similar components. When reference is made to a reference numeral without specification to an existing sublabel, it is intended to refer to all such multiple similar components.

DETAILED DESCRIPTION

Additional details are provided for treating whey protein mixtures to reduce the amounts of β-Lg and/or GMPs without substantially reducing the amount of α-La protein in the mixture. Details are also provided on the production of whey protein compounds from the treated whey protein mixtures, as well as the use of the compounds in a variety of products, including edible products such as protein fortified foodstuffs, beverages, and infant formula, among other products.

Exemplary Methods of Treating Whey Protein Mixtures

Figure 1:
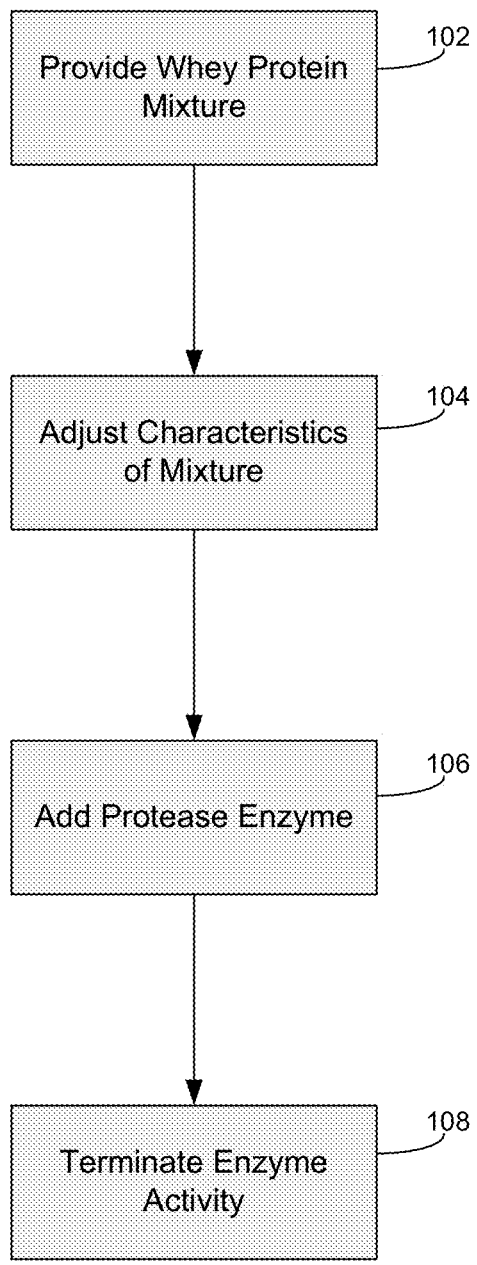
FIG. 1 shows selected steps in methods of treating a whey protein mixture according to embodiments of the invention.

FIG. 1 shows a flowchart with selected steps in a method 100 of treating a whey protein mixture. The method 100 may include providing a whey protein mixture 102 that contains α-La, β-Lg and GMPs. Alternatively, the whey protein mixture 102 may lack significant concentration of GMPs when, for example, the whey protein source is milk. As noted above, the whey protein mixture may be derived from a dairy source, such as bovine milk and/or cheese whey that is separated from cheese curd.

The method 100 may continue with adjustment of one or more physical and/or chemical characteristics of the whey protein mixture 104 prior to the addition of protease enzymes. These physical and/or chemical characteristics may include the temperature and pH of the mixture. For example, if the temperature of the mixture is provided at room temperature (~68° F./20° C.) it may be cooled to a temperature of about 10° C. or less. Similarly, the pH of the whey protein mixture may be adjusted to greater than 7. Typically the pH of native whey compositions such as sweet whey derived from pasta filata cheesemaking has a pH of less than 7 (e.g., about 6), and cheese made by direct-acid coagulation processes can produce acidified whey with an even lower pH. The pH of these whey mixtures may be raised by, for example, adding a base such as aqueous sodium hydroxide, potassium hydroxide, calcium hydroxide, etc., to the whey mixture.

The protease enzymes may be added to the whey protein mixture 106 to selectively hydrolyze the β-Lg, and if present the GMPs, in the mixture. Sources for the protease enzymes may include microorganisms, fungi, plant, and/or animal sources, among others. For example, the protease enzymes may be derived from fungi of the genus *Aspergillus*, bacteria of the genus *Bacillus* (e.g., *Bacillus subtilis*), and/or animals (e.g., trypsin, chymotrypsin, etc.), among other sources. The protease enzymes may be added in a single aliquot mixed into the whey protein mixture, or in a plurality of additions. The enzymes may also be continuously streamed into the stirred or agitated whey protein mixture.

Following the addition of the protease enzymes, the whey protein mixture may undergo an incubation phase. During this time the protease enzymes are selectively hydrolyzing the β-Lg and GMPs while leaving the α-La substantially intact. The pH and temperature of the whey protein mixture may be monitored during the incubation, and may be adjusted if the temperature increases above a threshold temperature (e.g., about 10° C., about 12° C., about 15° C., etc.) and/or the pH drops below a threshold level (e.g., less than about 6).

During the incubation phase the amount or concentration of the α-La may optionally be monitored for decreases that may indicate an increasing amount of hydrolysis by the protease enzymes. This monitoring may include one or more measurements of the α-La concentration in the whey protein mixture and/or measurements for protein hydrolysates indicative of protease enzyme hydrolysis of α-La.

When the incubation phase has reached an endpoint, the activity of the protease enzyme may be terminated 108. If the concentration of the α-La and/or its hydrolysates is being monitored, the endpoint may be reached when the concentration of the α-La drops below a threshold level and/or the hydrolysates climb above a threshold level.

The catalytic activity of the protease enzymes may be terminated by subjecting the hydrolyzed whey protein mixture to a rapid increase in temperature above a level that inactivates the enzymes. For example, a flash temperature process, where the hydrolyzed whey protein mixture flows across a rapid heat exchange plate, can raise the mixture temperature above an enzyme inactivation point in about 1 to 10 seconds or less.

The hydrolyzed whey protein mixture may include the protein hydrolysates of β-Lg and GMPs and a significantly higher ratio of α-La to β-Lg and GMPs. As described below, the hydrolyzed whey protein mixture may be additionally treated and purified to make a protein product with increased levels of α-La for products such as protein fortified sports drinks and infant formula, among others.

Figure 2:
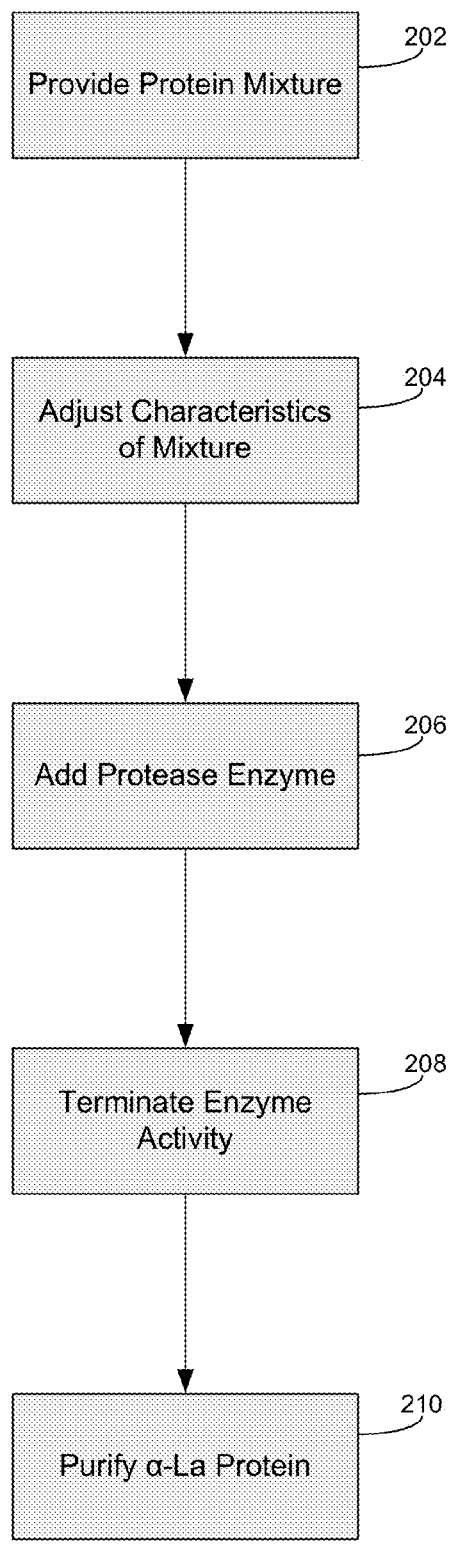
FIG. 2 shows selected steps in methods of making whey protein compositions with increased concentration of α-La protein according to embodiments of the invention.

FIG. 2 shows selected steps in a method 200 of making a protein composition with an increased concentration of α-La protein. The method 200 may include providing a protein mixture 202 that contains a number of dairy proteins, such as α-La, β-Lg, GMPs, serum albumins, and caseins, among others. The protein mixture may be adjusted 204 to a temperature and pH level that will facilitate the selective enzymatic hydrolysis of β-Lg and GMPs over α-La, before undergoing a protease enzyme incubation 206.

After terminating the catalytic activity of the protease enzymes 208, the original protein mixture is transformed into a mixture of proteins and protein hydrolysates. This mixture may be purified 210 to form the protein composition with increased concentration of α-La. One exemplary purification method is filtering the larger α-La from the smaller protein hydrolysates of β-Lg and GMPs, among other proteins. This may involve filtering the hydrolyzed mixture through a micro-porous filter having pore sizes selected to pass the protein hydrolysates as permeate while blocking the unhydrolyzed α-La as retentate. Depending on the α-La purity level desired, the mixture may make a single pass through the filter, or multiple passes. Additional filtration methods may include cross-flow filtration and diafiltration. Purification methods that may be used in addition to, or in lieu of, filtration may include resin chromatography that selectively binds or separates the unhydrolyzed α-La, or the hydrolysates.

The purified protein composition may be incorporated into foodstuffs and medications, among other products. For example, the increased concentration of α-La makes the composition well suited for use in infant formulas where the ratio of α-La to β-Lg and GMPs significantly higher than untreated cow's milk. The composition may also be incorporated into sports drinks and other protein fortified beverages. In addition, the composition may be incorporated into protein fortified energy bars, confectionaries, cheeses, and other foods.

Figure 3:
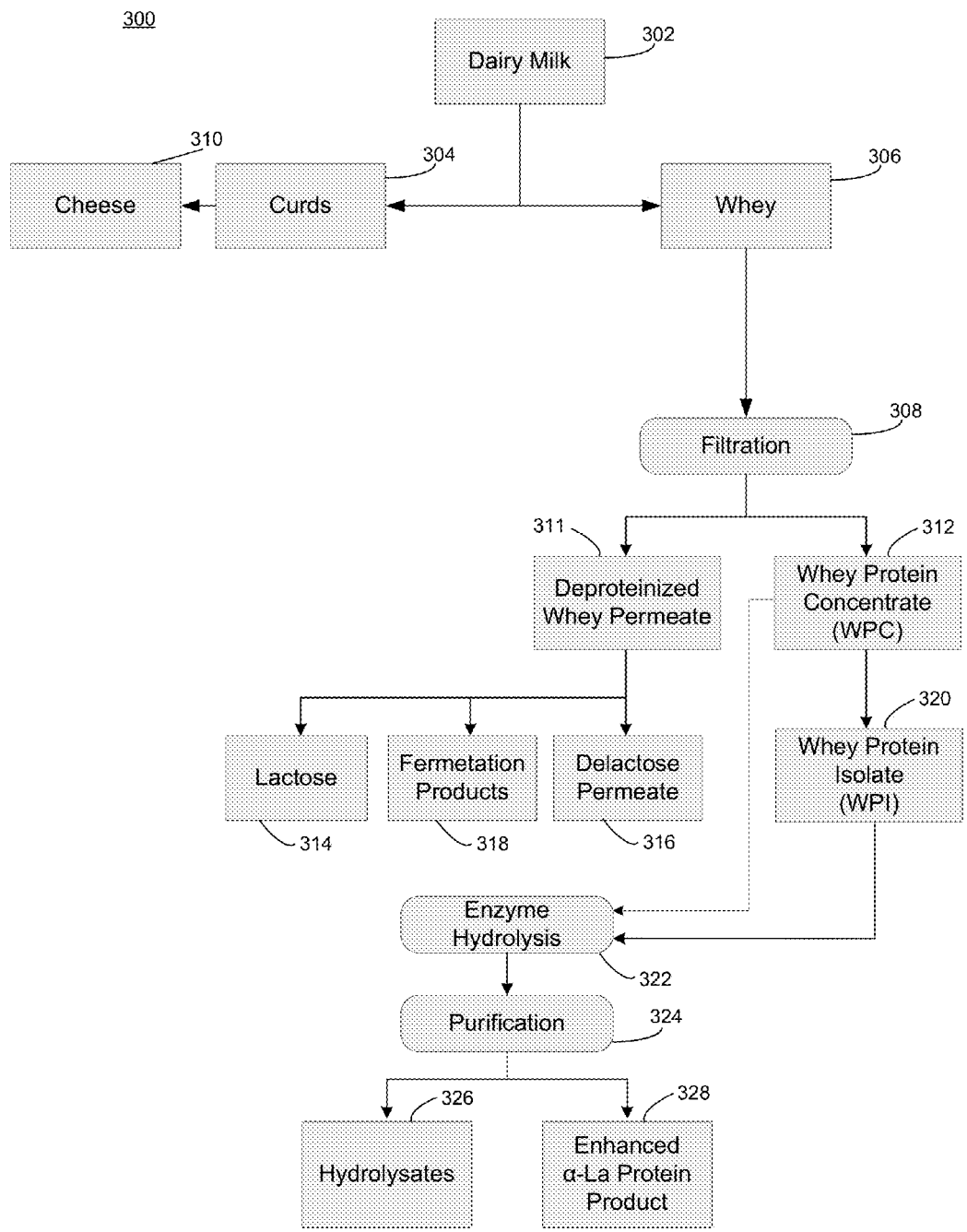
FIG. 3 is a flowchart showing selected steps and products for processing dairy milk into α-La enhanced protein and other products.

The exemplary methods of treating the whey proteins described above may be integrated into conventional processes of converting dairy milk into foods such as cheese. FIG. 3 is a flowchart showing selected steps and products for processing dairy milk into α-La enhanced protein and other products. The method 300 includes forming dairy milk 302 such as whole milk, raw milk, partially defatted milk, skim milk, etc., into a mixture or coagulum of curds 304 and whey 306. The whey may then be separated from the curds 304 and further processed into a starting whey protein mixture, while the curds are processed into cheese 310.

The whey protein separated from the curds may include a number of additional ingredients such as dairy sugars (e.g., lactose), dairy fats, and other proteins (e.g., caseins), among others. The whey protein may be purified to reduced the concentration of one or more of these ingredients prior to, or in addition to, increasing the concentration of α-La. For example, the whey protein may undergo a crystallization process 312 that separates crystallized lactose 314 from a whey solution with reduced lactose concentration (delactose whey 316). The delactose whey may then be treated to make a α-La enhanced protein composition. Additional examples may include filtering the whey protein 318 (e.g., ultra-filtration) into a deproteinized whey permeate 320 and whey protein retentate 322 (e.g., whey protein concentrate "WPC"). The deproteinized whey permeate may be further purified by, for example, crystallization to separate lactose 324 from a delactose permeate 326. It may also be converted into alcohols and other fermentation products 328. The whey protein concentrate may be converted into α-La enhanced protein, or may undergo additional purification (e.g., filtration) into whey protein isolate (WPI) 330.

Sources of whey protein such as the delactose whey 316, whey protein concentrate 322, and whey protein isolate 330, may then undergo enzyme hydrolysis 332 that selectively favors the hydrolysis of β-Lg and GMPs over α-La. The selectively hydrolyzed whey composition may then be purified 334 to separate the protein hydrolysates 336 from the α-La enhanced protein product 338. The α-La enhanced protein product 338 may then be incorporated into a variety of products, including infant formula, protein fortified sports drinks and beverages, and solid foodstuffs such as cheeses, confectionaries, etc.

Exemplary Systems for Making Treated Whey Protein Products

Figure 4:
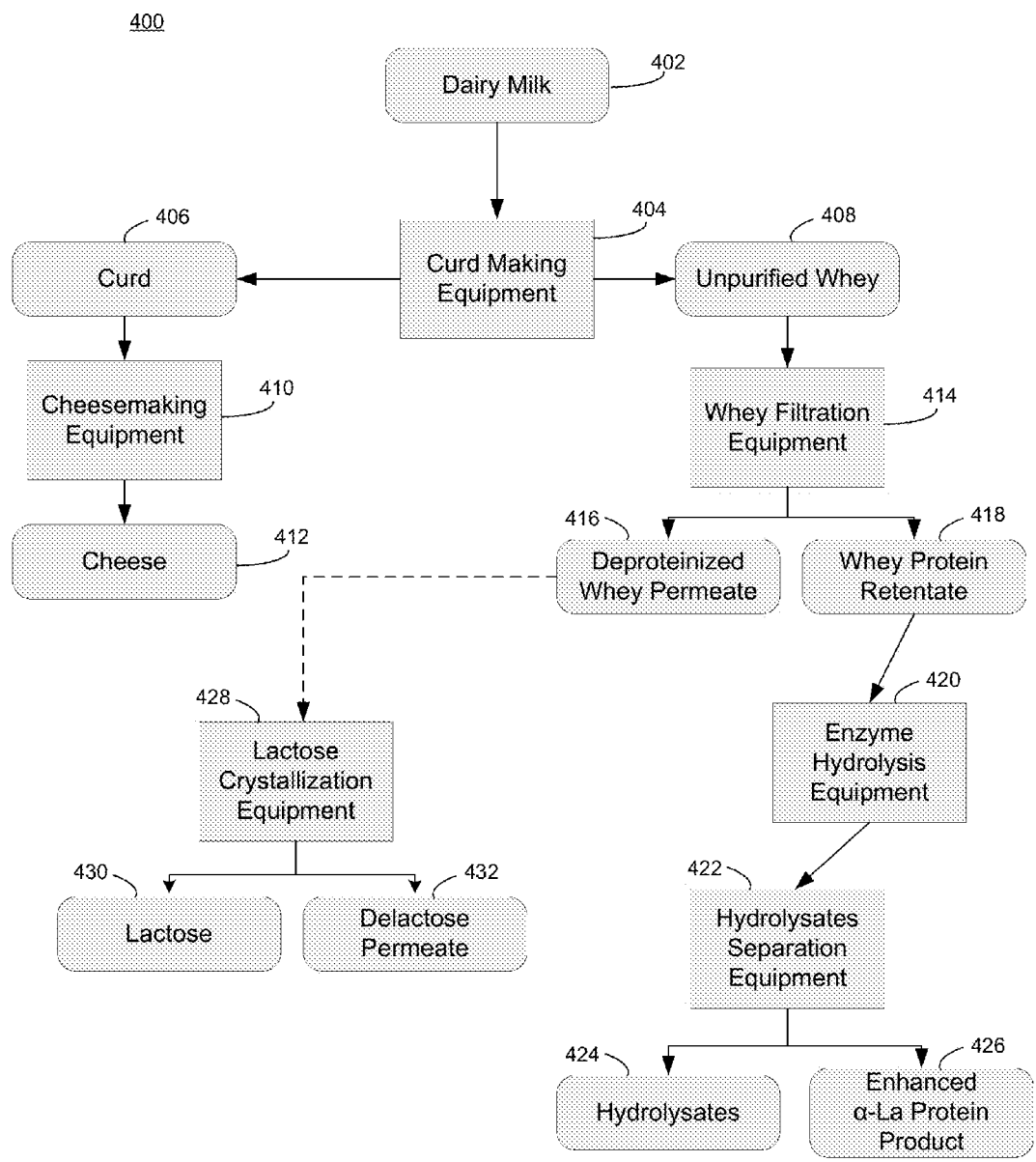
FIG. 4 shows selected components of a system for treating a whey protein mixture according to embodiments of the invention.

FIG. 4 shows selected components of a system 400 for making a whey protein mixture from dairy milk 402 according to embodiments of the invention. The system 400 may include curd making equipment 404 that converts the dairy milk 402 into curd 406 and an unpurified liquid whey mixture 408. In the example shown, the curd 406 is provided to cheesemaking equipment 410 to be processed into cheese 412.

The unpurified liquid whey mixture 408 may include dairy sugars (e.g., lactose), dairy fats, and dairy proteins including whey proteins and casein proteins. This mixture 408 may be filtered with whey filtration equipment 414 to separate a deproteinized whey permeate 416 from whey protein retentate 418. The permeate may include sugars, fats and proteins that were not caught in filtration membrane as part of the retentate. The whey protein retentate may be provided to the enzyme hydroysis equipment 420 as a whey protein concentrate (WPC) or may undergo further purification into a whey protein isolate (WPI) before being hydrolyzed.

The enzyme hydrolysis equipment 420 combines the source of whey protein with protease enzymes under controlled environmental conditions that favor the hydrolysis of certain whey proteins (e.g., β-Lg and GMPs) over others (e.g., α-La). At the end of the hydrolysis process, the mixture of hydrolysates and unhydrolyzed proteins is provided to hydrolysates separation equipment 422 that separate the hydrolysates 424 from the unhydrolyzed proteins, including the unhydrolyzed α-La protein product 426. The hydrolysates separation equipment 422 may include filtration equipment (e.g., ultra-filtration membranes) that hold back the larger unhydrolyzed proteins in the retentate while passing the smaller hydrolysates in the permeate. Additional hydrolysates separation equipment 422 may include beads and resins that selectively (and optionally reversibly) bind or separate either the unhydrolyzed proteins or the hydrolysates while passing the other component through to the effluent.

In the exemplary system 400 shown, lactose crystallization equipment 428 may be used to separate and purify lactose 430 and form a delactose permeate 432. Lactose sources for the lactose crystallization equipment 428 may include the deprotenized whey permeate 416 separated from the whey protein retentate 418 by the whey filtration equipment 414. Lactose sources may also include the unpurified whey 408, which may undergo lactose separation to make a delactose whey 434 that may then be provided to the whey filtration equipment 414 or directly to the enzyme hydrolysis equipment 420. The lactose 430 produced by the lactose crystallization equipment 428 may be packaged or incorporated into products such as foodstuffs and cosmetics.

It should be emphasized that the system 400 shown in FIG. 4 is not the only configuration for making an enhanced α-La protein product 426 from a starting material such as dairy milk 402. For example, other systems (not shown) may bypass the curd making equipment 404 and provide the starting dairy milk 402 to alternate equipment (not shown) that separates the curd proteins (e.g., casein) from whey proteins. The whey protein may then be provided directly to the enzyme hydrolysis equipment 420 or undergo further purification before the hydrolysis step. In such exemplary systems, no cheese may be produced.

EXAMPLE

An α-La enriched whey protein composition is made from whey protein concentrate (WPC) that is a by-product of mozzarella cheese making. The process starts with WPC retentate (80% protein on dry basis) that is concentrated using ultrafiltration (UF) from the raw whey mixture separated from cheese curd. The 80% WPC is transferred to a temperature controlled holding tank where it is mixed with water to make a 10.3%, by wt., diluted whey protein solution. The holding tank can hold a 1,000 lb batch of the whey protein mixture, where 128.75 lbs of the 80% WPC solids are mixed with water to form the diluted whey protein solution.

The diluted whey protein solution is then made basic by adding 20% sodium hydroxide to the holding tank. For the 1,000 lb batch, 30 lbs of the 20% NaOH is used to raise the pH of the whey mixture to 10.45. The basic whey protein solution sits in the holding tank at about 7.2° C. or less, for 5 hours before the addition of the protease enzymes.

Addition of the protease enzymes starts the cold incubation phase of the protein hydrolysis that selectively hydrolyzes at least a portion of β-lactoglobulin and glycomacropeptides in the whey protein mixture. In this experiment, the protease enzyme is a neutral protease sourced from *Bacillus subtilis* and sold commercially under the tradename Protamex® by Novozymes of Denmark. It is added to the basic whey protein mixture at a level of about 0.5% by wt. of the total protein in the substrate. For the 1,000 lb batch, about 0.515 lb of Protamex is added.

The cold incubation phase lasts for 24 hours at 7.2° C. Thereafter the enzymes are inactivated by heating the mixture to 90.5° C. for 10 minutes.

Following inactivation, the protein hydrolysate mixture is subjected to ultrafiltration with a MWCO 5 kDa filter that separates the aqueous permeate from the retentate. The permeate comprises hydrolysis products of β-lactoglobulin and glycomacropeptides, and the retentate comprises α-lactalbumin. The retentate is then spray dried to produce a powdered α-lactalbumin enriched whey protein composition.

The ratio of α-lactalbumin to β-lactoglobulin of the starting material 80% WPC retentate and the finished product α-lactalbumin enriched whey protein composition is determined by SDS-PAGE. The results are shown in Table 1:

TABLE 1

α/β Ratio In Starting WPC Retentate and α-La Enriched Product

| Sample Description | α/β Ratio |
|---|---|
| 80% WPC Retentate | 0.3 |
| Alpha-lactalbumin Enriched Whey Protein Composition | 3.4 |

Having described several embodiments, it will be recognized by those of skill in the art that various modifications, alternative constructions, and equivalents may be used without departing from the spirit of the invention. Additionally, a number of well-known processes and elements have not been described in order to avoid unnecessarily obscuring the present invention. Accordingly, the above description should not be taken as limiting the scope of the invention.

Where a range of values is provided, it is understood that each intervening value, to the tenth of the unit of the lower limit unless the context clearly dictates otherwise, between the upper and lower limits of that range is also specifically disclosed. Each smaller range between any stated value or intervening value in a stated range and any other stated or intervening value in that stated range is encompassed. The upper and lower limits of these smaller ranges may independently be included or excluded in the range, and each range where either, neither or both limits are included in the smaller ranges is also encompassed within the invention, subject to any specifically excluded limit in the stated range. Where the stated range includes one or both of the limits, ranges excluding either or both of those included limits are also included.

As used herein and in the appended claims, the singular forms "a", "an", and "the" include plural referents unless the context clearly dictates otherwise. Thus, for example, reference to "a process" includes a plurality of such processes and reference to "the protein" includes reference to one or more proteins and equivalents thereof known to those skilled in the art, and so forth.

Also, the words "comprise," "comprising," "include," "including," and "includes" when used in this specification and in the following claims are intended to specify the presence of stated features, integers, components, or steps, but they do not preclude the presence or addition of one or more other features, integers, components, steps, acts, or groups.

What is claimed is:

1. A method of treating a whey protein mixture to increase a relative concentration of α-lactalbumin protein in the mixture, the method comprising:
   adjusting a temperature of the whey protein mixture to about 10° C. or less, and adjusting the pH of the mixture to greater than 7;
   adding a protease enzyme to the whey protein mixture that selectively hydrolyzes at least a portion of β-lactoglobulin protein in the mixture;
   terminating activity of the protease enzyme in the hydrolyzed whey protein mixture before a substantial portion of the α-lactalbumin protein has been hydrolyzed by the enzyme; and
   filtering the hydrolyzed whey protein mixture into a retentate comprising the α-lactalbumin protein and a permeate comprising the hydrolyzed β-lactoglobulin protein.

2. The method of claim 1, wherein the protease enzyme further selectively hydrolyzes glycomacropeptides in the whey protein mixture.

3. The method of claim 1, wherein the whey protein mixture is made by:
   separating sweet whey from curd; and
   filtering the sweet whey to form the whey protein mixture and a deproteinized whey permeate.

4. The method of claim 1, wherein the pH of the whey protein mixture is adjusted to about 10 or more.

5. The method of claim 1, wherein the activity of the protease enzyme is terminated by flash heating the hydrolyzed whey protein mixture.

6. The method of claim 1, wherein the pH of the whey protein mixture is adjusted by adding a hydroxide compound to the mixture.

7. The method of claim 6, wherein the hydroxide compound comprises an alkali metal hydroxide.

8. The method of claim 1, wherein the temperature of the whey protein mixture is adjusted to about 0° C. to about 10° C. prior to adding the protease enzyme.

9. The method of claim 1, wherein the α-lactalbumin protein is incorporated into infant formula.

10. A method of making a protein composition, the method comprising:
    providing whey protein solution comprising α-lactalbumin and β-lactoglobulin;
    adjusting a temperature of the whey protein solution to about 10° C. or less, and adjusting the pH of the solution to greater than 7;
    adding a protease enzyme to the whey protein solution, wherein the protease enzyme selectively hydrolyzes at least a portion of the β-lactoglobulin;

terminating activity of the protease enzyme to produce the protein composition with an increased ratio of α-lactalbumin to β-lactoglobulin compared to the whey protein solution; and filtering the hydrolyzed whey protein mixture into a retentate comprising the α-lactalbumin protein and a permeate comprising the hydrolyzed β-lactoglobulin protein.

11. The method of claim 10, wherein the whey protein solution further comprises glycomacropeptides and the protease enzyme selectively hydrolyzes the glycomacropeptides.

12. The method of claim 10, wherein the method further comprises generating the whey protein solution from a dairy source.

13. The method of claim 12, wherein the dairy source is selected from the group consisting of raw milk, skim milk, partially defatted milk, and whole milk.

14. The method of claim 10, wherein substantially all the β-lactoglobulin has been hydrolyzed in the protein composition.

15. The method of claim 11, wherein substantially all the glycomacropeptides have been hydrolyzed in the protein composition.

16. The method of claim 10, wherein the pH of the whey protein solution is adjusted to greater than 10.

17. The method of claim 1, wherein the whey protein mixture is maintained at a temperature of about 15° C. or less while the β-lactoglobulin protein is selectively hydrolyzed by the protease enzyme.

18. The method of claim 10, wherein the whey protein solution is maintained at a temperature of about 15° C. or less while the β-lactoglobulin protein is selectively hydrolyzed by the protease enzyme.

19. The method of claim 1, wherein the method reduces an amount of the β-lactoglobulin protein in the retentate by at least 60 wt. % compared to the starting whey protein mixture.

20. The method of claim 1, wherein the method reduces an amount of the β-lactoglobulin protein in the retentate by at least 95 wt. % compared to the starting whey protein mixture.

21. The method of claim 1, wherein the retentate comprising the α-lactalbumin protein has a weight ratio of β-lactoglobulin protein to α-lactalbumin protein ranging from 0.2:1 to 0.125:1.

* * * * *